United States Patent [19]
Borrelli et al.

[11] Patent Number: 4,832,724
[45] Date of Patent: May 23, 1989

[54] METHOD OF MAKING COLORED PHOTOCHROMIC GLASSES

[75] Inventors: Nicholas F. Borrelli, Elmira; Dennis W. Smith; Brent M. Wedding, both of Corning, all of N.Y.

[73] Assignee: Corning Glass Works, Corning, N.Y.

[21] Appl. No.: 161,092

[22] Filed: Feb. 26, 1988

[51] Int. Cl.$^4$ ............................................. C03C 21/00
[52] U.S. Cl. ................................... 65/30.11; 65/32.3; 501/13
[58] Field of Search .................... 65/30.11, 32; 501/13

[56] References Cited

U.S. PATENT DOCUMENTS

| | | | |
|---|---|---|---|
| 2,075,446 | 10/1934 | Leibig | 49/88 |
| 3,208,860 | 7/1962 | Armistead et al. | 106/54 |
| 3,892,582 | 7/1975 | Simms | 106/52 |
| 3,920,463 | 11/1975 | Simms | 106/54 |
| 4,190,451 | 2/1980 | Hares et al. | 106/47 |
| 4,240,836 | 12/1980 | Borrelli et al. | 106/47 |
| 4,390,592 | 6/1983 | Ernsberger | 65/30.11 X |
| 4,405,672 | 9/1983 | Araujo et al. | 65/30.11 X |
| 4,537,612 | 8/1985 | Borrelli et al. | 65/30.11 |

Primary Examiner—Robert L. Lindsay
Attorney, Agent, or Firm—Kees van der Sterre

[57] ABSTRACT

A method for modifying surface coloration in silver halide-containing photochromic glasses developed by thermal reduction treatments is described, which method comprises subjecting the glass, prior to the coloring thermal reduction treatment, to a silver ion exchange treatment during which silver ions are introduced into at least a portion of the surface of the glass article. Subsequent thermal reduction of the silver-containing surface portion of the glass provides novel colors and/or color patterns therein.

7 Claims, 2 Drawing Sheets

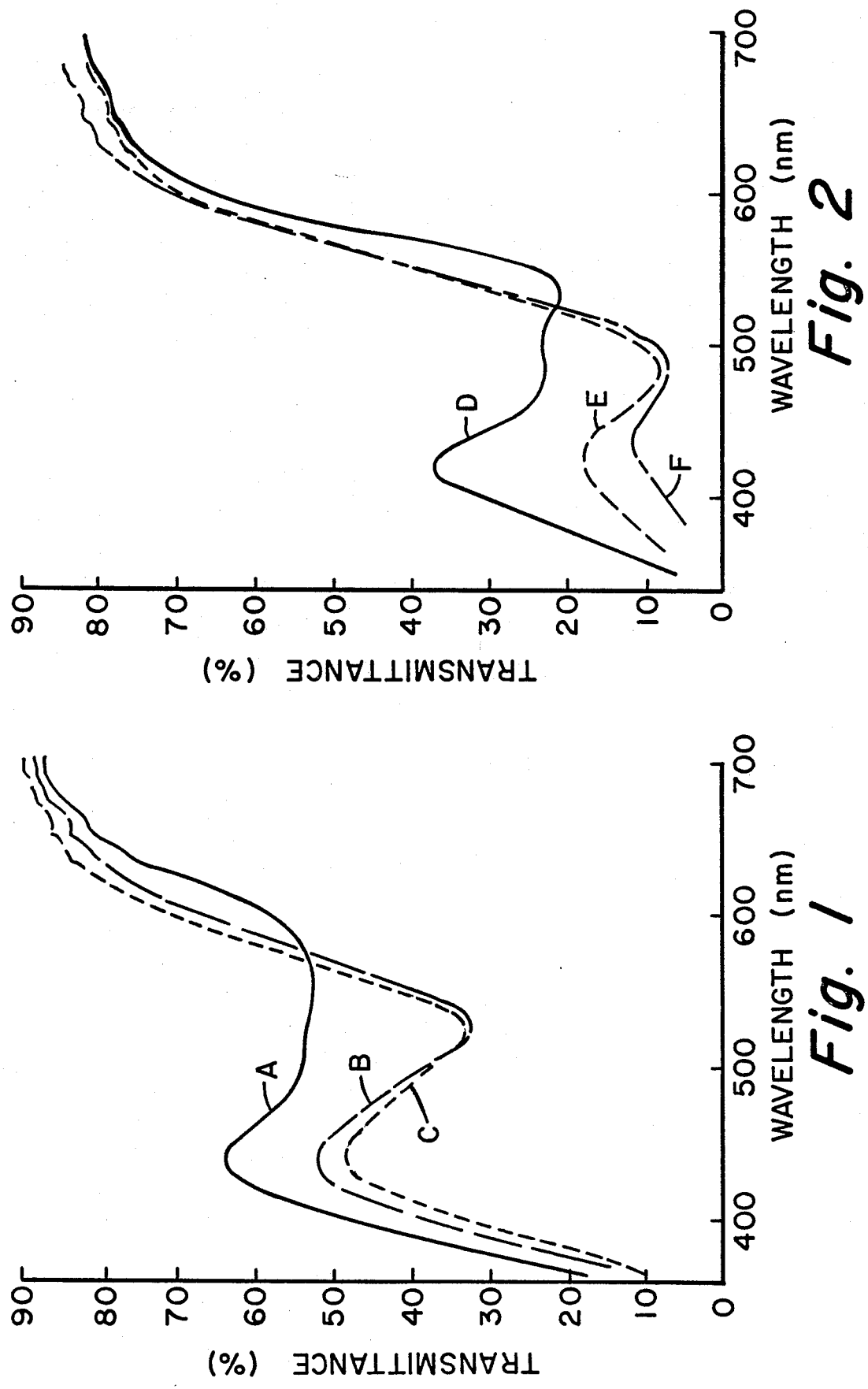

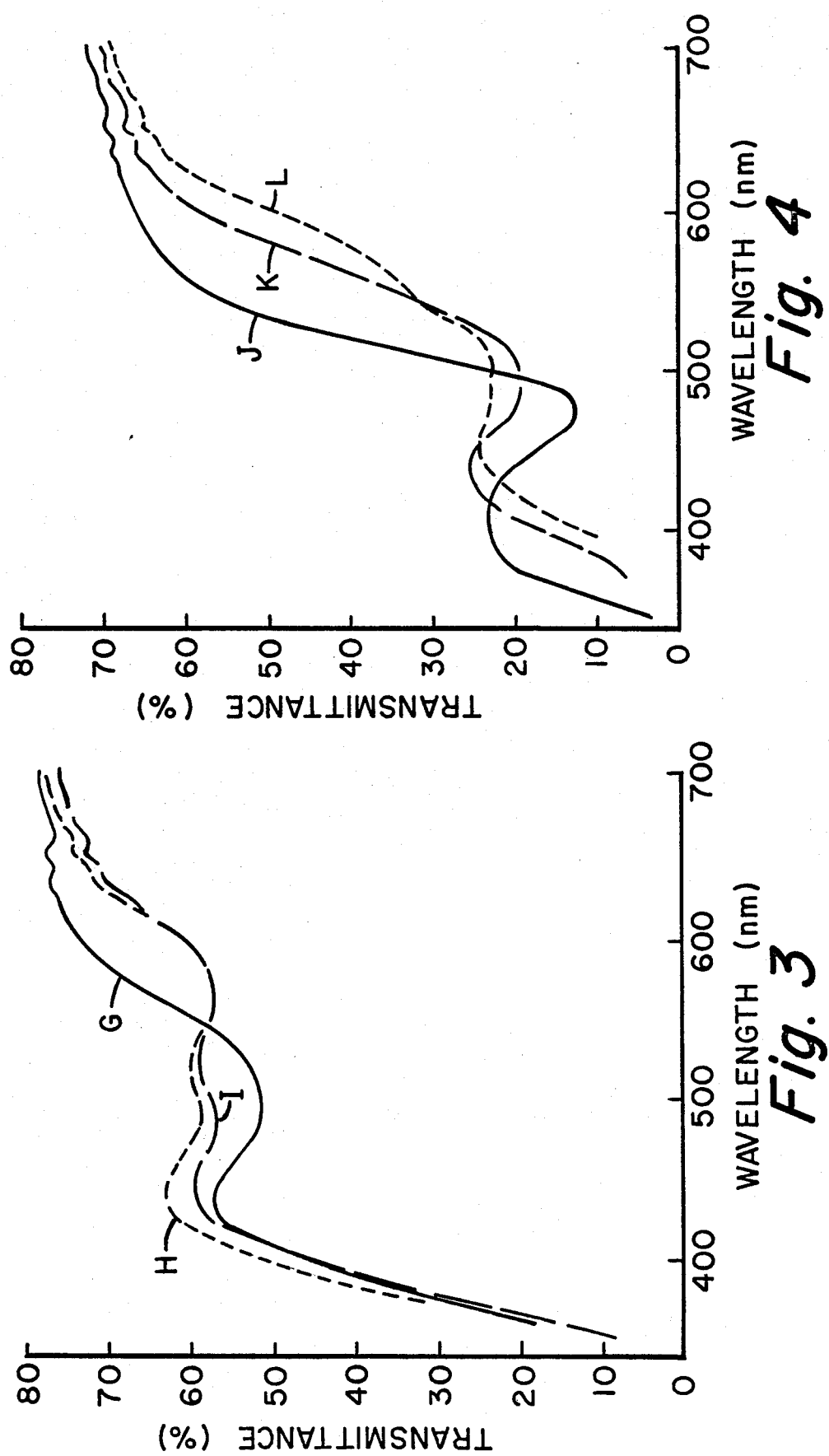

METHOD OF MAKING COLORED PHOTOCHROMIC GLASSES

BACKGROUND OF THE INVENTION

The present invention relates to a method for coloring photochromic glasses, and more particularly to a method for influencing the surface coloration induced in such glasses by heat treatment in a reducing environment.

Photochromic glasses may be generally characterized as glasses which darken upon exposure to actinic radiation, e.g., ultraviolet light, and which fade in color upon the removal of the activating light. Such glasses have been widely employed commercially in the manufacture of ophthalmic lens blanks which will darken under bright outdoor conditions and fade in shade or indoors. Sunglass lenses have also been made of photochromic glasses of this type.

All of the commercially important photochromic glasses are glasses which contain a precipitated microcrystalline silver halide phase as the reversibly darkenable phase which causes the darkening of the glass. U.S. Pat. No. 3,208,860 provides the basic description of this family of glasses. Subsequent work has resulted in the development of many new families of photochromic glasses exhibiting faster darkening and/or fading response. U.S. Pat. No. 4,190,451, for example, provides a description of significantly improved photochromic glasses of this type.

Silver halide-containing photochromic glasses which exhibit a desired fixed tint in the undarkened state have also been commercially successful. These include glasses containing conventional glass colorants, as well as glasses wherein coloration is imparted not by the inclusion of glass colorants, but by treatment of the glass after manufacture with a coloring surface treatment. U.S. Pat. Nos. 3,892,582 and 3,920,463 disclose thermal reduction treatments useful for imparting yellow surface colors to photochromic glasses, while U.S. Pat. No. 4,240,836 describes a modified thermal reduction treatment which permits the development of a broad range of colors in this type of glass.

It is also known that red and yellow colors can be generated in the surfaces of certain alkali borosilicate glasses by so-called "staining" processes. U.S. Pat. No. 2,075,446, for example, teaches the such colors can be obtained by exchanging silver or copper ions for alkali metal ions in these glasses, followed by a thermal reduction post-treatment to develop the desired color. However, for these glasses, thermal reduction post-treatment are not effective to achieve other than yellow or amber colors in glasses which have been ion-exchanged with silver.

A coloration mechanism which has been postulated for the case of thermal reduction of photochromic glasses involves the growth of light-absorbing silver metal particles on or near the silver halide crystallites in the glass. Changes in the size and/or configuration of these particles may be responsible for the variations in coloration which are observed. In contrast, silver and/or copper "staining" coloration is attributed to precipitated metal particles alone.

In U.S. Pat. No. 4,537,612, a method for helping to control the coloration induced in a silver halide-containing photochromic glass by a thermal reduction treatment is described. In that patent, a silver halide-containing photochromic glass to be colored is subjected to an alkali metal ion exchange treatment during which potassium and/or lithium ions in the glass are exchanged for sodium ions from a suitable ion source such as a sodium salt. This alkali metal ion exchange, whether conducted prior to or subsequent to the coloring thermal reduction treatment, somehow alters the absorption bands generated in the glass by the treatment. Frequently, the result is a desirable shift in absorption to somewhat longer wavelengths, so that colors not readily generated by thermal reduction treatments alone can be developed in certain glasses.

Unfortunately, ion exchange processes such as described in the above-mentioned patent have not been found effective to modify the coloration of some well known commercial photochromic glasses to a useful degree. In particular, Corning Code 8097 glass, a glass commercially sold under the trade name PHOTOGRAY, is only slightly affected by these ion-exchange treatments.

It is therefore a principal object of the present invention to provide a modified method for developing surface coloration in photochromic glasses which offers improved effectiveness for treatment of photochromic glasses resistant to thermal reduction coloration.

It is a further object of the invention to provide a method for surface-coloring photochromic glasses which offers additional control over the hue and depth of coloration achievable by the thermal reduction of such materials.

Other objects and advantages of the invention will become apparent from the following description thereof.

SUMMARY OF THE INVENTION

The present invention provides a method for modifying the range of surface coloration which can be induced in silver halide-containing photochromic glasses by thermal reduction treatments. Broadly characterized, the modification is achieved by subjecting a silver halide-containing photochromic glass article, prior to the coloring thermal reduction treatment, to a silver ion exchange treatment during which silver ionds are introduced into at least a portion of the surface of the glass article.

The introduction of the silver ions can be accomplished by exposing the photochromic glass to a source of silver ions at a temperature at least sufficient to cause the migration of the silver ions into the glass surface, this normally occurring by ion exchange of the silver for alkali metal ions present in the glass. The silver is conveniently derived from an inorganic silver compound, with the preferred source of silver ions consisting of a molten salt mixture comprising a suitable concentration of silver ions.

Following the treatment of a surface portion of the photochromic glass to introduce silver ions therein, the article is subjected to a thermal reduction treatment to develop surface coloration therein. Any of the known methods for thermal reduction treatment may be used. However, in accordance with preferred prior practice, the thermal reduction treatment used in the present process is generally carried out at a temperature not exceeding about 450° C., in order to avoid excessive reduction and the development of overly yellow coloration in the glass.

The product of this process is a glass article exhibiting surface coloration of a nature similar to that of prior art surface-colored glasses. However, in the present case the developed surface coloration is found to depend strongly on the nature and duration of the prior silver ion exchange treatment. Thus the final color may be controlled by the silver ion exchange step.

Further, the method of the invention has been found to be effective in developing new colors in glasses previously showing only a narrow range of coloration by thermal reduction treatments. Thus, for example, colors other than yellow may readily be developed in photochromic glasses such as Corning Code 8097 glass, which exhibit restricted coloration when colored by reduction treatments alone.

DESCRIPTION OF THE DRAWINGS

The invention may be further understood by reference to the drawings wherein:

FIG. 1 plots optical transmittance versus wavelength through selected fast-fading photochromic glass samples subjected to differing ion-exchange treatments and mild thermal reduction in accordance with the invention;

FIG. 2 plots optical transmittance versus wavelength through selected fast-fading photochromic glass samples subjected to differing ion-exchange treatments and a strong thermal reduction treatment in accordance with the invention;

FIG. 3 plots optical transmittance versus wavelength through selected color-restricted photochromic glass samples subjected to differing ion-exchange treatments and mild thermal reduction in accordance with the invention; and FIG. 4 plots optical transmittance versus wavelength through selected color-restricted photochromic glass samples subjected to differing ion-exchange treatments and a strong thermal reduction treatment in accordance with the invention.

DETAILED DESCRIPTION

The process of the invention appears to have general applicability to silver halide-containing photochromic glasses regardless of the base composition of the glass. Thus even in glasses readily colored by thermal reduction treatments alone, the present method is useful to modify the resulting color of the glass, and therefore provides a convenient method for patterning or otherwise controlling the development of the surface color.

Photochromic glasses which may be employed in the practice of the invention include, for example, those disclosed in U.S. Pat. No. 4,190,451. Those glasses consist essentially, in weight percent, of about 0-2.5% $Li_2O$, 0-9% $Na_2O$, 0-17% $K_2O$, 0-6% $Cs_2O$, 8-20% $Li_2O+Na_2O+K_2O+Cs_2O$, 14-23% $B_2O_3$, 5-25% $Al_2O_3$, 0-25% $P_2O_5$, 20-65% $SiO_2$, 0.004-0.02% CuO, 0.15-0.3% Ag, 0.1-0.25% Cl, and 0.1-0.2% Br, wherein the molar ratio of alkali metal oxides:$B_2O_3$ ranges between about 0.55-0.85, and wherein the weight ratio Ag:(Cl+Br) ranges between about 0.65-0.95. Optional constituents selected from the group consisting of $ZrO_2$, $TiO_2$, PbO, BaO, CaO, MgO, $Nb_2O_5$, $La_2O_3$, and F may also be included, as may minor amounts of transition metal oxides and/or rare earth metal oxides as inert glass colorants.

Other glasses useful in accordance with the invention are those disclosed in U.S. Pat. No. 4,018,965. These are silver halide-containing, lithium boroaluminosilicate glasses exhibiting excellent photochromic properties after heat treatment, and which are chemically strengthenable by ion exchange procedures. The disclosed glasses will generally have compositions consisting essentially, in weight percent, as selected from Table I below:

TABLE I

| | | | |
|---|---|---|---|
| $SiO_2$ | 54–66 | $Li_2O + Na_2O + K_2O$ | 6–16 |
| $Al_2O_3$ | 7–15 | Ag | 0.1–1 |
| $B_2O_3$ | 10–25 | Cl | 0.1–1 |
| PbO | 0–3 | Br | 0–3 |
| $Li_2O$ | 0.5–4 | F | 0–2.5 |
| $Na_2O$ | 3.5–15 | Transition metal oxide colorants | 0–1 |
| $K_2O$ | 0–10 | Rare earth metal oxide colorants | 0–5 |

Additional glass compositions which may be treated in accordance with the invention are those reported in U.S. Pat. No. 4,358,542, which are photochromic glasses exhibiting properties improved over those described in the prior art in that they exhibit a deeper darkened transmittance and a more rapid fade rate. These glasses will have compositions consisting essentially, in weight percent of the oxide basis, as shown in the following Table II:

TABLE II

| | | | |
|---|---|---|---|
| $SiO_2$ | 55–60 | PbO | 0.1–0.25 |
| $Al_2O_3$ | 9–10 | Ag | 0.1–0.15 |
| $B_2O_3$ | 19–20.5 | Cl | 0.3–0.5 |
| $Li_2O$ | 2–2.5 | Br | 0.05–0.15 |
| $Na_2O$ | 2–3 | CuO | 0.0065–0.01 |
| $K_2O$ | 6–7 | | |

The invention has particular applicability to the treatment of silver halide-containing silicate glasses wherein conventional thermal reduction treatments are effective to develop only pink to yellow coloration in the glass. Glasses of this type, exemplified by Corning Code 8097 photochromic glass, tend to develop such colors regardless of the thermal reduction treatment employed. With the present process, however, these glasses will frequently develop colors other than pink or yellow which are of much greater commercial value in ophthalmic and sunglass products.

The process by which silver is introduced into the selected surface portion of the silver halide-containing photochromic glass is not critical, and this may therefore be accomplished by any technique known to the art for achieving the desired result. The preferred technique, however, is by means of a silver for alkali metal ion-exchange treatment, hereinafter simply referred to as a silver ion-exchange treatment.

Typically, the introduction of silver by ion exchange in accordance with the invention requires that the glass be in contact with a source of silver ions at a temperature sufficiently high to promote the migration of the silver into the glass at a useful rate. The source of silver is conventionally a silver salt, and a particularly convenient method for introducing silver into the surface of silver halide-containing photochromic glasses is by immersion into or other contact of the glass with a molten salt bath or other preparation comprising silver ions.

Whereas silver salts alone could theoretically be used, either in the form of a molten salt bath or as a coating of molten salt on the surface of the glass article, a more economical and preferred practice is to provide the silver ions as an additive to a molten alkali metal salt bath such as a molten sodium nitrate salt bath. The concentration of silver in this method does not need to be large; silver concentrations on the order of 0.1 molar AgNO3 in molten NaNO3 are quite suitable for achieving an effective exchange of silver ions into the glass in substitution for alkali metal ions therein.

Mixtures of silver and alkali metal salts can be fused and maintained as molten salt mixtures at temperatures of 270° C. and above, and these temperatures are also sufficiently high to promote rapid silver ion exchange into the glass. Thus exposure of a silver halide-containing photochromic glass to a molten salt bath comprising silver ions at temperatures in this range for times on the order of 0.1–10 hours will normally be sufficient to introduce into the surface of the glass a concentration of silver ions effective to achieve the desired color modification on subsequent thermal reduction treatment.

Most preferably, the concentration of silver in the glass resulting from this step will not be so great as to develop significant coloration of the glass by silver precipitation, in order that the final glass color may better be controlled. Coloration at this stage can be avoided by using low silver concentrations in the salt bath and by limiting the time and/or temperature of the ion-exchange treatment.

Reduction heat treatments for the development of surface coloration in silver halide-containing photochromic glasses are well known in the art, and typically involve exposing the glass to reducing conditions at an elevated temperature to achieve chemical reduction of a surface layer of the glass. The coloration developed by such treatments depends on both the temperature and the duration of the treatment, these variables apparently affecting the size and/or configuration of the phases developed and/or modified by the chemical reduction process.

For the treatment of silver halide-containing photochromic glasses to develop a wide range of colors therein, thermal reduction treatments of this type will, as previously noted, be carried out at temperatures below 450° C. A reducing atmosphere, most preferably a flowing atmosphere which insures a continual supply of reducing agents at or near the surface of the glass, is conventionally used. Hydrogen, or alternatively hydrogen-containing atmospheres such as forming gas (a mixture of hydrogen and nitrogen), are particularly preferred, although other reducing atmospheres such as cracked ammonia, methane, carbon monoxide or the like could instead be employed.

In accordance with the present process, the absorption characteristics ultimately produced in the surface of the photochromic glass by thermal reduction are found to depend directly upon the nature and extent of the initial silver ion-exchange treatment. Thus the final coloration developed in the photochromic glass may be controlled by varying the silver ion exchange step, as well by modifying the thermal reduction treatment. This is advantageous because, for a standard thermal reduction treatment, a range of product coloration is available. Also, as previously noted, color variations may be generated within individual glass products as color gradients or localized color variations, through the use of localized or patterned silver ion-exchange treatments. This permits the economical production of patterned or gradient photochromic glass products.

The invention may be further understood by reference to the following examples, which are intended to be illustrative rather than limiting.

EXAMPLE 1

Photochromic ophthalmic lens blanks composed of Corning Code 8111 glass, such lenses being commercially available under the trademark PHOTOGRAY EXTRA, are selected for treatment. These lens blanks have the approximate composition reported below, in weight percent:

| | | | |
|---|---|---|---|
| $SiO_2$ | 55.8 | $ZrO_2$ | 4.9 |
| $Al_2O_3$ | 6.5 | $TiO_2$ | 2.2 |
| $B_2O_3$ | 18.0 | Ag | 0.24 |
| $Li_2O$ | 1.9 | Cl | 0.20 |
| $Na_2O$ | 4.0 | Br | 0.13 |
| $K_2O$ | 5.8 | CuO | 0.011 |

The ophthalmic lens blanks thus selected are ground and polished to provide samples of approximately 2 mm thickness, and the samples are divided into three groups for treatment.

A molten salt bath comprising silver ions is then prepared for treating the photochromic glass samples. The salt bath is composed of a mixture of molten $AgNO_3$ and molten $NaNO_3$, $AgNO_3$ being added to the bath in a concentration of about 0.1 molar (i.e., 0.1 moles of silver salt per liter of salt bath), and the bath being heated to a temperature of approximately 325° C.

The glass samples from the first group of lens blanks are not subjected to any silver ion-exchange treatment, but samples from the second and third groups are ion-exchanged by immersion in the silver-containing molten salt bath for 1 hour and 4 hours, respectively. Following ion exchange, the glasses so treated are removed from the salt bath, rinsed with water, and dried.

Samples from each of the three groups are next subjected to a thermal reduction treatment wherein they are contacted with a flowing hydrogen atmosphere while being maintained at a temperature of 320° C. for approximately 1 hour. This treatment induces strong absorption peaks with attendant surface coloration in all of the glass samples treated; however, the wavelength and intensity of the absorption is found to depend upon the prior ion exchange processing step.

The spectral transmittance characteristics of representative photochromic glass samples treated as above described are shown in FIG. 1 of the drawing. FIG. 1 plots transmittance as a function of wavelength for each of three glass samples so treated over the wavelength range of approximately 380–700 nm. Curve A shows the transmittance of a sample not subjected to a prior silver ion-exchange treatment, while Curves B and C show the transmittance, respectively, of samples subjected to the one-hour and four-hour silver ion-exchange treatments.

As the Figure indicates, all samples exhibit absorption peaks at wavelengths above 500 nm.; however, in the case of the glasses subjected to the prior silver ion-exchange treatment, the primary absorption bands, centered at about 510 nm., are both sharper and deeper than the absorption band exhibited by the glass sample not so treated.

The coloration behavior of silver ion-exchanged glasses under thermal reduction treatments is substantially different from that of glasses of the same composition which have been ion-exchange treated with alkali metal ions alone. The latter glasses, described in U.S. Pat. No. 4,537,612, are obtained by ion-exchange with a pure sodium nitrate or mixed sodium/potassium nitrate salt bath prior to thermal reduction treatment.

As indicated in that patent, Corning Code 8111 glass samples subjected to a 1 hour ion-exchange in NaNO₃ at 400° C., prior to thermal reduction treatment, exhibit surface coloration which is only slightly more intense and spectrally very similar to the surface coloration of the glass subjected to the reduction treatment alone. Hence the addition of even a small proportion of silver ions to the ion exchange bath, as in Example 1 above, substantially changes the resulting induced coloration of the glass.

EXAMPLE 2

Sample ophthalmic photochromic lens blanks composed of Corning Code 8111 glass as described in Example 1 are again selected for treatment. The samples are divided into three groups, and samples from each of the second and third groups are subjected to silver ion-exchange treatments in a molten salt bath having the composition of the salt bath described in Example 1. Samples from the second group are treated for 1 hour at 325° C. and samples from the third group for 4 hours at 325° C.

Following this treatment, all of the samples are subjected to a thermal reduction treatment comprising exposure to a flowing hydrogen atmosphere at 400° C. for 0.75 hour. Again, all the samples exhibit well-defined absorption peaks at the conclusion of the treatment.

FIG. 2 of the drawing plots the transmittance of representative samples from each of the three groups as a function of wavelength over the wavelength range from about 380–700 nm. Curve D in FIG. 2 shows the transmittance spectrum exhibited by a sample which had not been subjected to any silver ion exchange treatment, while curves E and F show corresponding curves for glass samples subjected to the 1 and 4 hour treatments, respectively.

Again, a marked change in the wavelength and definition of the absorption bands induced by the thermal reduction treatment is observed in the case of the samples subjected to a prior silver ion-exchange treatment. The silver-exchanged samples show a deeper and more sharply defined absorption at 490–500 nm., although these absorption bands are shifted somewhat toward lower wavelengths than in the parent glass.

EXAMPLE 3

Ophthalmic photochromic lens blanks composed of Corning Code 8097 glass, which glass has been commercially sold under the trademark PHOTOGRAY, are selected for treatment. These glasses have the following approximate composition, in weight percent:

| SiO₂ | 55.6 | PbO | 5.0 |
|---|---|---|---|
| B₂O₃ | 16.4 | ZrO₂ | 2.2 |
| Al₂O₃ | 8.9 | Ag | 0.16 |
| Li₂O | 2.65 | CuO | 0.035 |
| Na₂O | 1.85 | Cl | 0.24 |
| K₂O | 0.01 | Br | 0.145 |
| BaO | 6.7 | F | 0.19 |
| CaO | 0.2 | | |

The sample lens blanks are again divided into three groups and subjected to differing silver ion-exchange treatments. Samples from the first group are not treated for silver ion exchange, whereas samples from the second and third groups are subjected to ion-exchange treatments for 1 hour and 4 hours, respectively, in the silver-containing molten salt bath described in Example 1. Following this ion-exchange treatment, the treated samples are removed from the salt bath, rinsed with water, and dried.

The samples produced as described are next subjected to a thermal reduction treatment to develop surface coloration therein. The thermal reduction treatment comprises maintaining the samples under a flowing hydrogen atmosphere at 320° C. for 1 hour. Following this treatment, each of the samples is found to exhibit some absorption coloration, but with a strong dependence of absorption on the nature of the ion-exchange pretreatment.

FIG. 3 of the drawing plots transmittance versus wavelength over the approximate range 380–700 nm. for three glasses subjected to the above-described processing. Curve G in FIG. 3 shows transmittance for a representative glass sample not subjected to silver ion-exchange processing. The curve shows a broad but relatively shallow absorption peak centered at about 500 nm. This behavior is typical of glasses of this composition, wherein pink to yellow colors generally result from thermal reduction treatments, even at temperatures below 450° C., regardless of variations in time and temperature which may be utilized for the thermal reduction treatment.

Curves H and I show, respectively, transmittance curves for samples of the same composition but subjected to 1-hour and 4-hour silver ion-exchange treatments prior to the thermal reduction treatment. In both of the latter glasses, a new absorption band is seen to develop in the glass, centered at about 535 nm, which markedly alters the transmission characteristics of the glass. Thus these ion-exchange treated samples exhibit surface coloration significantly different from the non-treated sample, the predominant color being characterizable as a copper color and being a particularly desirable tint for commercial specialty sunglasses.

EXAMPLE 4

Glass samples composed of Corning Code 8097 glass are selected and separated into three groups for processing. The first group of samples is not treated for silver ion-exchange, while the second and third groups are treated for 1 and 4 hours, respectively, at 325° C. in the silver ion-exchange salt bath described in Example 1. Following this ion exchange treatment, all samples are subjected to a thermal reduction treatment comprising exposure of the glasses to hydrogen at 400° C. for 0.75 hour.

FIG. 4 of the drawing sets forth transmittance curves for three glass samples treated as above described, transmittance being reported as a function of wavelength over the wavelength range of approximately 380–700 nm. As in Example 3, the samples subjected to silver ion-exchange treatments for one hour and four hours (Curves K and L, respectively) demonstrate transmission characteristics which differ significantly from the transmission characteristics demonstrated by the sample not so treated (Curve J). The observed shift in absorption bands is similar in character to that observed in Example 3, in that somewhat less intense but significantly red-shifted absorption is developed. The resulting colors are not obtainable in glass of the same composition by means of thermal reduction treatments alone.

Thus the invention provides a novel and versatile method for modifying the surface colors of photochromic glass articles which can both enhance the colors resulting from thermal reduction treatments and provide localized variations in colors in a manner not previously achievable. Of course, the foregoing examples are merely illustrative of methods and products which will be practiced and provided by those skilled in the art within the scope of the appended claims.

We claim:

1. A method for producing a surface-colored photochromic glass article which comprises the steps of:
   (a) treating a silver halide-containing photochromic glass article with a source of silver ions to introduce silver into at least a surface portion of the article; and
   (b) heat-treating the article comprising the silver at a temperature not exceeding about 450° C. in a reducing environment for a time at least sufficient to modify the light absorption characteristics of at least that surface portion of the article comprising the silver.

2. In the method for producing a surface-colored photochromic glass article which comprises the step of heat treating the article not exceeding about 450° C. in a reducing environment for a time at least sufficient to modify the light absorption characteristics of at least a portion of the surface of the article, the improvement characterized in that, prior to the heat treating step, the said portion of the article is treated with a source of silver ions to introduce silver into at least that portion of the surface of the glass.

3. A method in accordance with claim 1 wherein the reducing environment consists of a reducing atmosphere.

4. A method in accordance with claim 3 wherein the reducing atmosphere is hydrogen.

5. A method in accordance with claim 1 wherein the source of silver is a silver salt.

6. A method in accordance with claim 5 wherein the silver salt is provided as a molten salt bath comprising silver ions.

7. A method in accordance with claim 6 wherein the molten salt bath consists essentially of a mixture of a molten alkali metal salt and a molten silver salt.

* * * * *